United States Patent [19]

van der Lely

[11] 4,285,404
[45] Aug. 25, 1981

[54] SOIL WORKING MACHINE WITH RESILIENT SUPPORT AND TRAILING, RIGID CONTROL ARM

[76] Inventor: Cornelis van der Lely, 7, Brüschenrain, Zug, Switzerland

[21] Appl. No.: 43,844

[22] Filed: May 30, 1979

[30] Foreign Application Priority Data

Jun. 5, 1978 [NL] Netherlands ................ 7806075

[51] Int. Cl.³ .............................................. A01B 35/06
[52] U.S. Cl. ..................................... 172/708; 172/643; 172/657
[58] Field of Search ................ 172/657, 658, 659, 660, 172/705, 707, 708, 709, 710, 748, 643

[56] References Cited

FOREIGN PATENT DOCUMENTS 403288 9/1924 Fed. Rep. of Germany ........... 172/705
820344 11/1951 Fed. Rep. of Germany ........... 172/708

Primary Examiner—Richard T. Stouffer
Attorney, Agent, or Firm—Mason, Mason and Albright

[57] ABSTRACT

A soil working machine, such as a cultivator, has a frame beam to which a working element is connected by a support. The support is resilient or resiliently mounted and can deflect when the working element meets an obstruction, or heavy ground resistance, but the working element maintains its orientation in the soil. A control rod coextends with the support and four pivot points enable the element to be displaced without loosing its orientation. The working element is pivotally connected to the support by a pivot pin and the control arm also can be pivoted to that element. In a variant, the control arm is eliminated and a V-shaped share is hinged to pivot up and down between stops.

8 Claims, 12 Drawing Figures

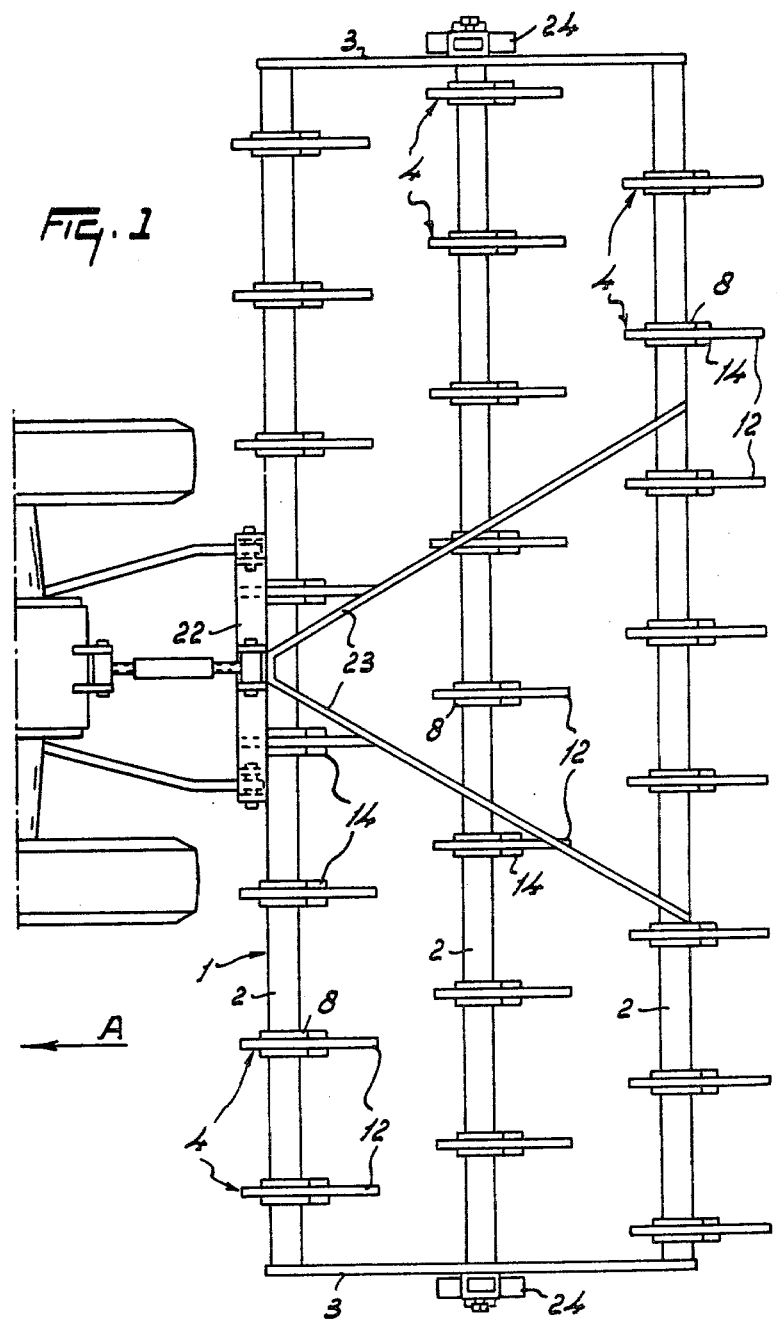

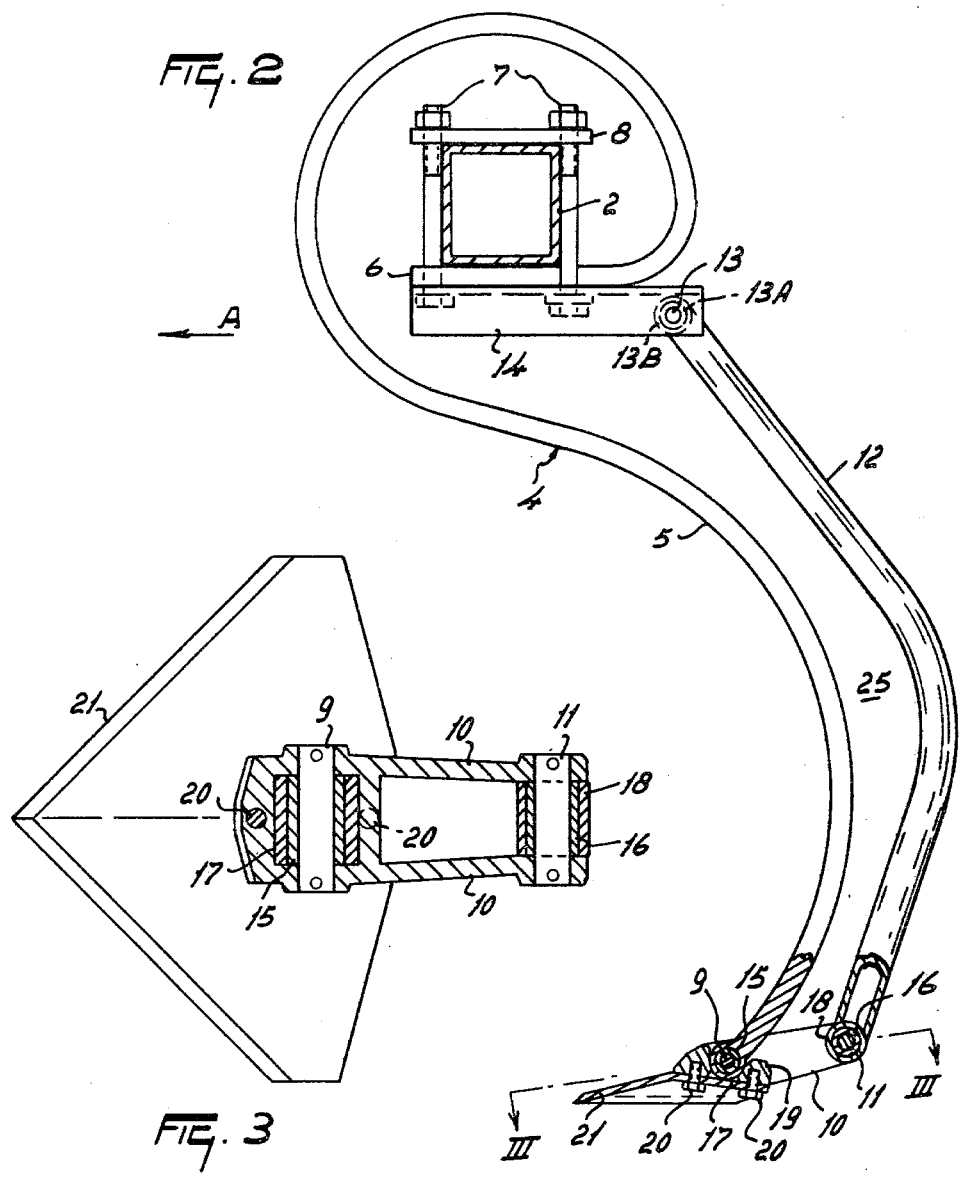

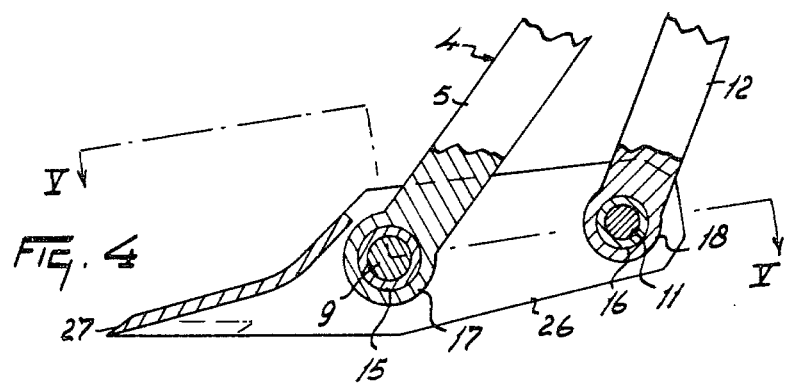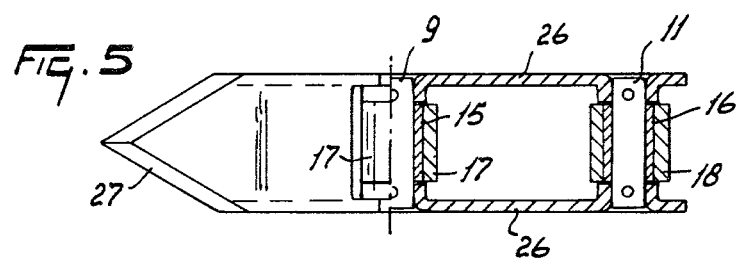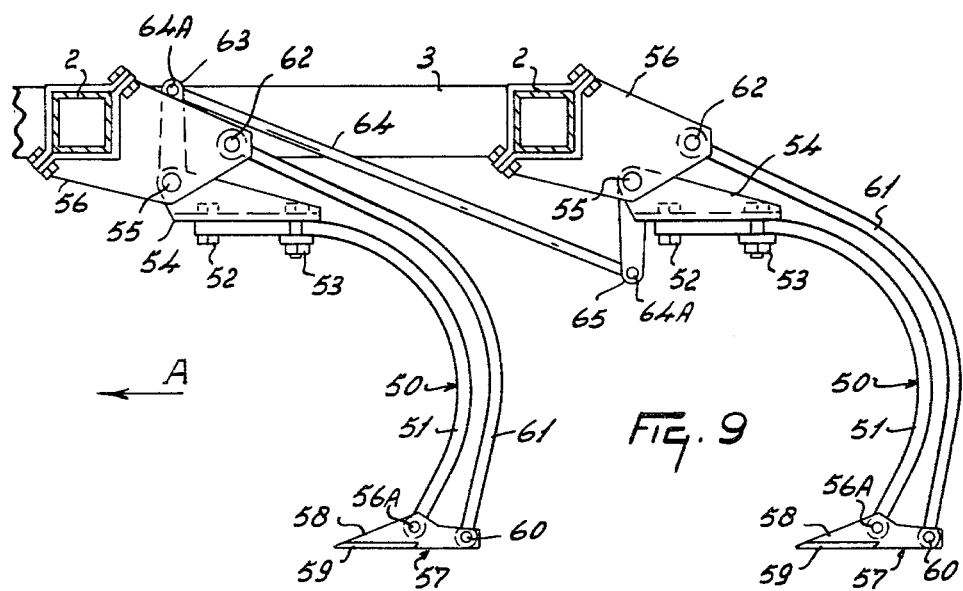

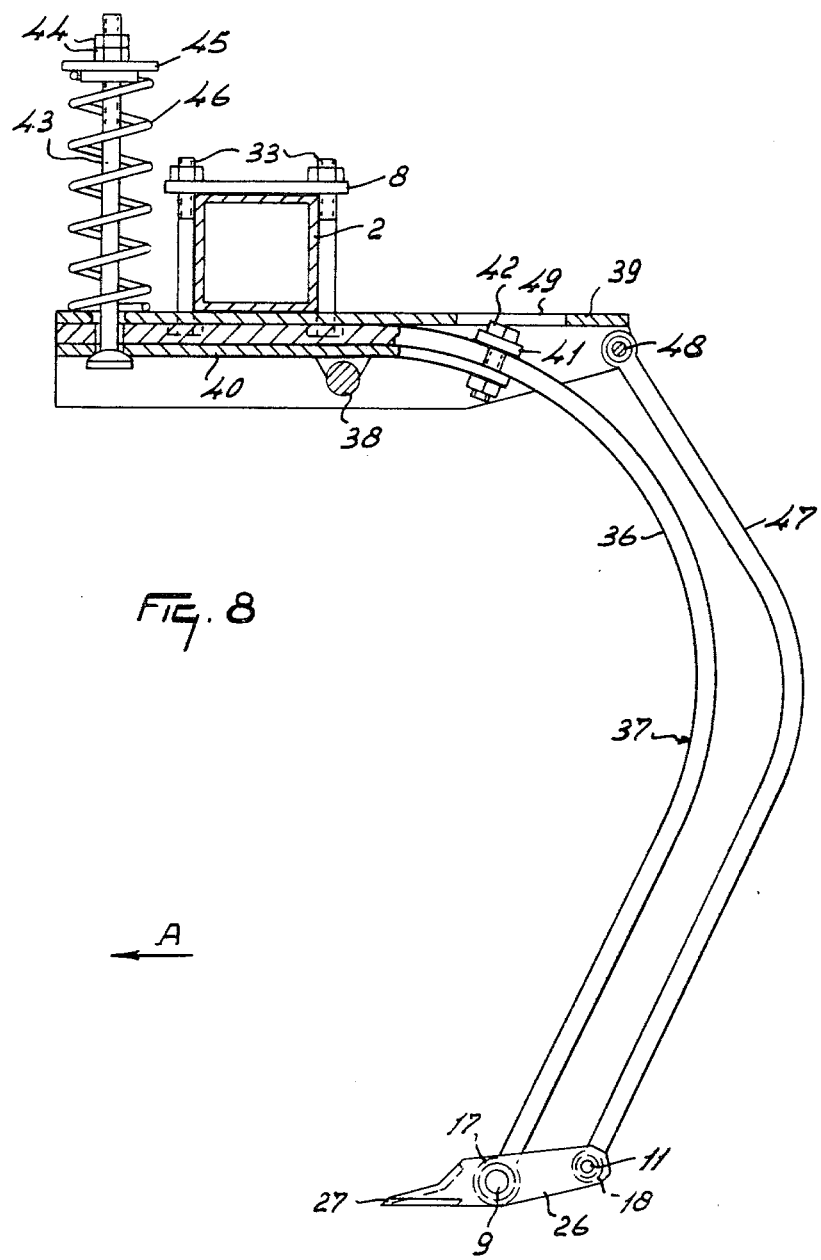

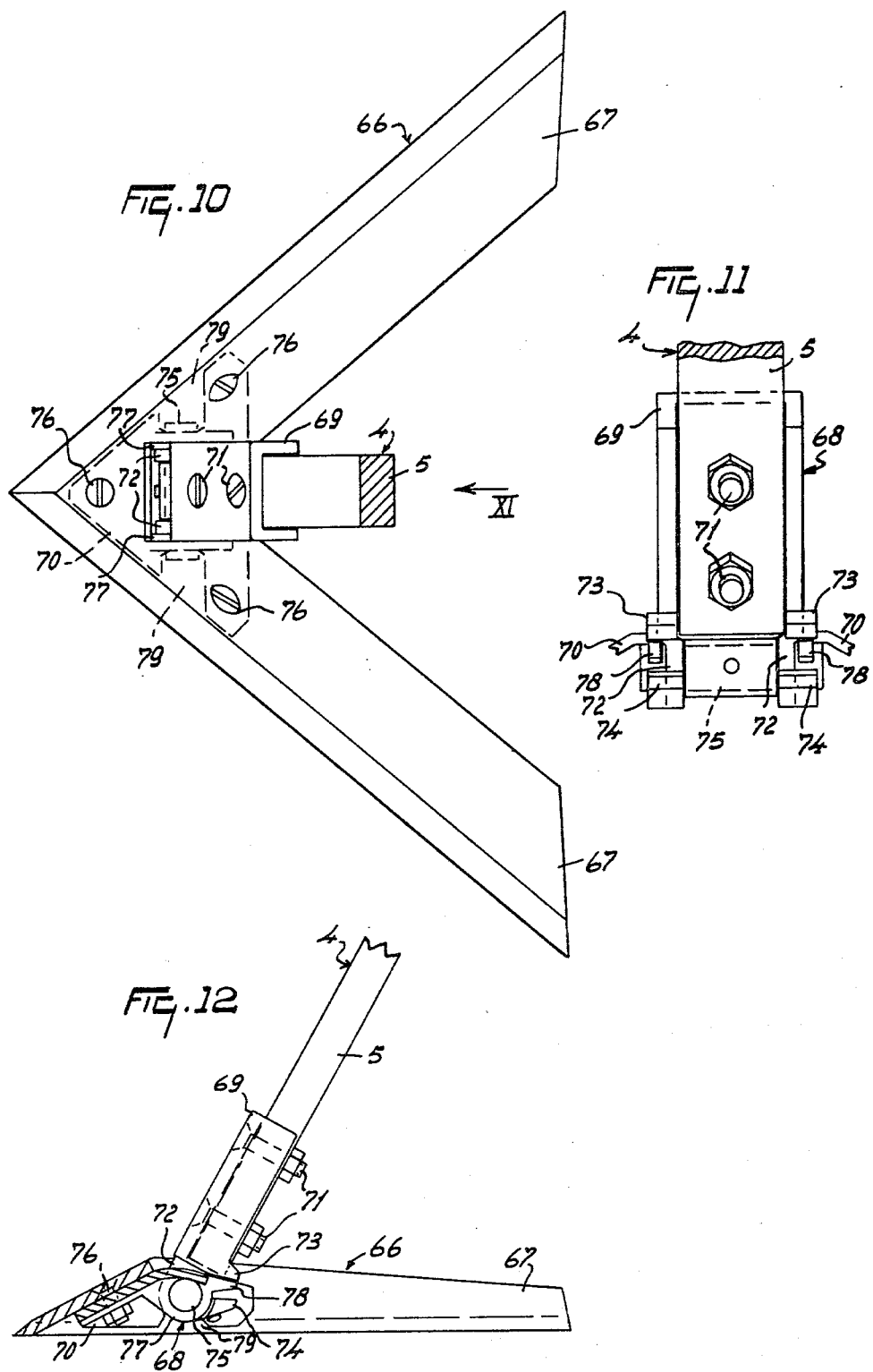

SOIL WORKING MACHINE WITH RESILIENT SUPPORT AND TRAILING, RIGID CONTROL ARM

According to a first aspect to the present invention there is provided a soil working machine comprising a frame and a working member, the working member comprising a support which carries a working element, at least that part of the support to which the working element is connected being displaceable with respect to the frame, the working element being pivotally connected to the support at the lower region of the support for movement about an axis which extends transversely of the intended direction of operative travel of the machine and is disposed to the rear of the leading side of the movable working element.

According to a second aspect of the present invention there is provided a soil working machine comprising a frame and a working member comprising a support provided with a working element the working element being mounted on a carrier which is pivotally connected to the support.

For a better understanding of the present invention and to show how it may be carried into effect, reference will now be made, by way of example only, to the accompanying drawings in which:

FIG. 1 is a plan view of a soil working machine;

FIG. 2 is an enlarged, partly sectioned, side elevation of a working member of the machine of FIG. 1;

FIG. 3 is a view taken on the line III—III in FIG. 2;

FIG. 4 shows a second embodiment of a working member;

FIG. 5 is a view taken on the line V—V in FIG. 4;

FIG. 8 shows a third embodiment of the connection between the working member and the frame of the machine;

FIG. 9 shows a fourth embodiment of the connection between the working members and the frame of the machine;

FIG. 10 shows a second embodiment of the operative portion of a working member;

FIG. 11 is an enlarged view taken in the direction of the arrow XI in FIG. 10; and FIG. 12 is a view taken on the line XII—XII in FIG. 10.

Figure 6:
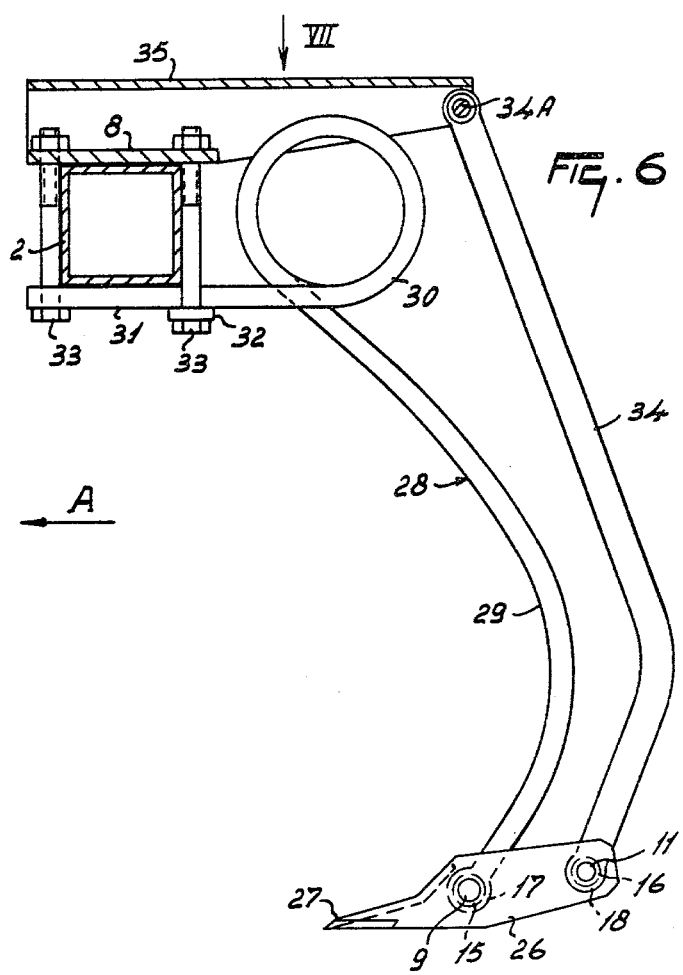
FIG. 6 shows a second embodiment of the connection between the working member and the frame of the machine.

The construction illustrated in the Figures is a soil working machine in the form of a cultivator.

The machine comprises a frame 1 having three parallel, horizontal beams 2 which extend transversely of the intended direction A of operative travel of the machine. At their ends, the beams 2 are joined to one another by tie strips 3 extending in the direction A. The beams 2 are hollow, with a square cross-section, and are disposed so that two opposite sides of each beam are substantially horizontal. Each beam 2 is provided with a plurality of evenly spaced working members 4 such as tines. The working members on each beam are off-set sideways from those on the other beams. Each working member 4 comprises a support 5 of resilient strip material, which is generally in the shape of an S. At the top, the support 5 has a portion which bends over across a frame beam 2 and terminates in a fastening portion 6 extending in the direction A. The fastening portion 6 is secured to the lower surface of the frame beam 2 by bolts 7 which pass through a clamping piece 8 on the top surface of the frame beam 2. The lower end of the support 5 is connected by a pivotal pin 9 with a cast-iron carrier 10, which is inclined slightly upwardly to the rear away from the pivotal joint. At the rear, the carrier 10 is pivotally connected by a pivotal pin 11 to the lower end of a control arm 12, the top end of which is connected by a pivotal pin 13 between the flanges of a channel-shaped mounting 14, which is clamped by the bolts 7 to the bottom suface of the fastening portion 6 of the support 5, there-by clamping the fastening portion 6 in place. The mounting 14 extends in the direction A. The pivotal pin 13 is arranged near the rear end of the mounting 14 and is journalled in a nylon bearing 13A in a sleeve 13B fitted to the control arm 12. The control arm 12 has a curve which projects rearwardly, so that the arm 12 generally follows the curve of the support 5, as is apparent from FIG. 2. The slightly sharper curve of the control arm 12 provides enough space for rearward deflection of the support 5. The control arm 12 is tubular.

The pivotal pins 9 and 11 are disposed in openings in the carrier 10 and are journalled in nylon bearings 15 and 16 in a sleeve 17 at the lower end of the support 5 and a sleeve 18 at the lower end of the control arm 12 (FIG 3).

Behind the pivotal pin 9 the carrier 10 has a stop 19 for co-operation with the rear of the support 5 to limit upward movement of the carrier. Beneath the pivotal joint with the support 5, the carrier 10 has at the bottom a flat part, which is slightly inclined downwardly from front to back. To this flat part is releasably fastened by bolts 20 a working element in the form of a blade 21. The blade 21 is triangular and extends slightly downwards on both sides of a central line (see FIG. 3). In a normal position of the support 5 the blade 21 is substantially horizontal.

At the front the leading frame beam 2 is provided with a trestle 22, the top of which is connected by means of diverging supports 23 to the trailing frame beam. Each of the tie strips 3 is provided with a ground-engaging wheel 24, which is vertically adjustable.

The cultivator described above operates as follows. During operation, the machine is attached by means of the trestle 22 to the three-point lift of a tractor and is moved in the direction A. During a run of the machine the blades 21 on the lower ends of the supports 5 of a working member 4 pass through the soil at a depth determined by the ground wheels 24. During the movement across the soil the blade 21 is in the position shown in FIG. 2. When the support 5 deflects to the rear under the action of an excessive resistance resulting, for example, from an obstacle in the soil, the support turns about an imaginary pivotal axis at the level of the mounting 14. When the support 5 deflects, the control arm 12 exerts on the rear end of the carrier 10 a downwardly directed force which turns the carrier relatively to the support 5 about the pivotal axis formed by the centre-line of the pivotal pin 9 so that the blade 21 maintains its initial position relative to the ground so that its operation is not adversely affected when the support 5 deflects.

The centerlines of the pivotal pins 9, 11 and 13 together with the imaginary pivotal axis about which the support 5 deflects are located at the corners of a pivotable polygon 25, which is substantially a parallelogram linkage. The imaginary pivotal axis of the support 5 is located, in the normal position of the carrier, substantially vertically above the front of the blade 21, whereas the pivotal pin 13 is located substantially over the pivotal pin 9 (FIG. 2). The distance between the imaginary pivotal axis of the support 5 and the centerline of the pivotal pin 13 for the control arm 12 is substantially equal to the distance between the centerlines of the pivotal pins 9 and 11.

FIGS. 4 and 5 show an embodiment using a carrier 26 including a blade 27, the two being punched from a single sheet. The triangular front edge of the component constitutes the blade 27 having cutting edges.

Figure 7:
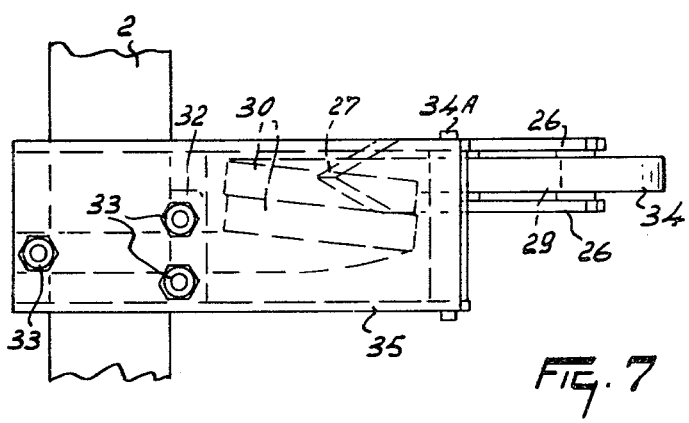
FIG. 7 is a view in the direction of the arrow VII in FIG. 6.

FIGS. 6 and 7 show an embodiment in which the support 29 of a working member 28 is made from spring material having an angular, preferably square cross-section and having two coils 30 located behind a frame beam 2, the support 29 terminating in a substantially horizontal fastening portion 31, which is fastened by clamping pieces 8 and 32 and bolts 33 to the lower side of the frame beam 2. In this embodiment the control arm 34 has an angular, preferably square, cross-section and is bent to the front at a region below its midpoint. The control arm 34 is pivoted by a pivotal pin 34A to the rear side of a protective member 35 for the fastening area of the support 29. The pin 34A is substantially vertically above the pin 9 (see FIG. 6) in the normal position of the support 29. The protective member 35 is fitted to the top of the frame beam 2 and is substantially channel-shaped, the flanges extending downwardly and at least partly enclosing the coils 30. In this embodiment the operation corresponds with that of the first embodiment and, as before, the support 29 has an imaginary pivotal axis, which coincides substantially with the centerline of the coils 30.

In the embodiment shown in FIG. 8 the support 36 of a working member 37 extends, from its lower end, upwardly and to the rear, then curving to the front to end in a forwardly extending, horizontal portion, which is pivotally mounted by a pivotal pin 38 between the downwardly extending flanges of a channel-shaped mounting 39, which is secured to the bottom of a frame beam 2. The support 36 of this embodiment is made from rigid material of angular cross-section.

From FIG. 8 it is apparent that the pivotal pin 38 is arranged just behind the frame beam 2 and beneath that portion of the support 36 which extends substantially in the direction A between the flanges of the mounting 39. The pivotal pin 38 is connected to a supporting strip 40 located beneath the support and fastened by a clamping piece 41 and bolts 42 to the support. The strip 40 extends up to the front end of the support. Near the front end of the support 36, an upwardly extending rod 43 passes through an opening in the strip 40, an opening in the support 36 and an opening in the web between the flanges of the mounting 39. At the top the rod 43 is provided with nuts 44 co-operating with a screw-thread of the rod. Between the top of the mounting 39 and a retaining plate 45 bearing on the lower of the nuts 44 the rod 43 is surrounded by a compression spring 46. The nuts 44 enable the tension of the spring 46 to be adjusted. In this embodiment the control arm 47 located to the rear of the working member curves forwardly at a region above its midpoint and is pivoted by means of a pivotal pin 48 to the rear side of the mounting 39. The operation of the construction shown in FIG. 8 substantially corresponds with that of the two preceding embodiments. However, in this construction the pivotal axis for the support 36 is the longitudinal centerline of the pivotal pin 38, which is located substantially at the same vertical level as the pivotal pin 48 for the control arm 47. As before, in this construction a pivotable polygon is provided for supporting the working element which is integral with the carrier 26, this polygon being substantially a parallelogram. The mounting 39 has near its rear end a recess 49, into which can move the clamping piece 41 and the bolts 42 fastening the carrier, when the carrier 36 is deflecting.

In the embodiment shown in FIG. 9, two working members 50 are shown, each of which comprises a support 51, which extends from its lower end upwardly and to the rear and then curves to the front, where it terminates in a substantially horizontal fastening portion. The fastening portion of the support 51 is connected by two bolts 52, 53, located one behind the other, to a support 54, which is pivotable about a pivotal pin 55 between two spaced plates 56 clamped to a frame beam 2. The lower end of the support 51 is connected by a pivotal pin 56 to a sheet material carrier 57 which has an integral point extending forwardly from the pivotal pin 56, this point comprising a working element 58, which is provided at its lower edge with cutting edges 59 which are inclined laterally from front to rear. The rear of the carrier 57 is pivoted by a pivotal pin 60 to a control arm 61, which has two straight end portions connected by a uniform curve which is substantially parallel to the support 51. The control arm 61 is pivotally connected by a pivotal pin 62 to the rear of the gap between the plates 56. In this embodiment the pivotal pin 62 for the control arm 61 is located in front of the working element 58 with respect to the direction A. The pivotal pin 55 for the support 51 of the leading one of the two consecutive working members 50 is provided between the plates 56 with an upwardly extending arm 63, which is pivotally connected at the top end by a pin 64A to a straight coupling rod 64 which is downwardly inclined from front to rear. The rear end of the coupling rod 64 is pivotally connected by a pin 64A to the lower end of a downwardly extending arm 65, which is fastened to the pivotal pin 55 arranged between the plates 56 for the support 51 of the trailing working member.

In the embodiment of FIG. 9 a pivotable polygon is, as before, provided for supporting the working elements 58. When the leading working member 50 deflects, the support 51 turning about the centre-line of the pivotal pin 55, the control arm 61 keeps the working element 58 in the correct working position. The support 51 of the trailing working member is also caused by the coupling rod 64 to deflect to move the working element more deeply into the soil. In this way, a state of equilibrium is established, during operation, between the two pivotally arranged working members 50 interconnected by the coupling rod 64 so that the force exerted on the leading working member is substantially equal to the force exerted on the trailing working member as a result of which a uniform working depth of the two tines is obtained.

FIGS. 10 to 12 show an embodiment in which the working element on the lower end of a support 5 is freely pivotable to a limited extent. In this embodiment the working element 66 is a V-shaped share having rearwardly diverging wings 67, which meet one another at the front at a folding line which is upwardly inclined from front to rear. The rear ends of the wings 67 are about 25 cms. apart. Between the working element 66 and the lower end of the support 5 there is a separate hinge 68 which has two fastening portions 69 and 70. The portion 69 is fitted to the lower end of the support 5 and the fastening portion 70 is fitted below the V-shaped front of the cultivating member. The fastening portion 69 has a channel-shaped cross-section and is secured in place by two bolts 71 disposed one above the other. The fastening portion 69 has two downwardly extending lugs 72 each provided at the rear with stops 73 and 74 one above the other. The lugs 72 each have a bore receiving a pivotal pin 75, which pivotally connects the fastening portion 70 to the fastening portion 69. The fastening portion 70 has a substantially triangular shape (see FIG. 10), which corresponds with the shape of the front of the working element. This portion is secured to the lower surface of the working element by bolts 76. On the rear, the fastening portion 70 is provided with lugs 77, through which passes the pivotal pin 75 and which each have a stop 78 for co-operation with the stop 73 and 74 for limiting the movement of the working element 66. For receiving the pivotal pin 75, the fastening portion 70 has passages 79. During operation the working element 66 can adapt to the varying resistances of the soil by deflecting to a limited extent about the axis of the hinge 68 so as to maintain a substantially horizontal working position. When the support 5 deflects, the working element can turn about the pivotal pin 75 under the action of its rearwardly extending wings 67 so that its position is substantially maintained. The use of the separate hinge 68, which is detachably connected both with the lower end of the support 5 and with the working element 66, allows the same hinge to be used with different supports and working elements so that, when the support or the working element is replaced, it is not necessary to replace also the comparatively expensive hinge.

While various features of the machines that have been described, and that are illustrated in the drawings, will be set forth in the following claims as inventive features, it is to be noted that the invention is not necessarily limited to these features and that is encompasses all of the features that have been described both individually and in various combinations.

I claim:

1. A soil working machine comprising a frame and at least one soil working member pivotably mounted for displacement on said frame, said member comprising a forward, upwardly extending resilient support and a trailing, rigid control arm, a generally horizontally extending soil working element being pivoted to the lower portions of said support and arm by respective pivots, the upper portions of said support and arm being interconnected to said frame by pivot means, said pivot means including at least one pivot that defines an axis parallel to the axes of said pivots, said control arm having an intermediate curved portion between its upper and lower portions and said curved portion being directed rearwardly with respect to the direction of travel of the implement, whereby said support can deflect rearwardly and said element maintains its working position, a stop being located adjacent said element for limiting the pivotal movement of said element in at least one direction.

2. A soil working machine as claimed in claim 1, in which said element comprises a carrier which is pivoted to said support.

3. A soil working machine as claimed in claim 2, in which said element is releasably connected to said carrier.

4. A soil working machine as claimed in claim 2, in which said control arm is pivotally connected to a mounting on said frame and said support is interconnected with said mounting.

5. A soil working machine as claimed in claim 1, in which the upper portion of said support is resilienty connected to the frame to pivot about an imaginary pivot and the pivot axis thereof is located substantially vertically above the front extremity of said element.

6. A soil working machine comprising a frame and at least one soil working member pivotably mounted for displacement on said frame, said member comprising a forward, upwardly extending resilient support and a trailing, rigid control arm, a generally horizontally extending soil working element being pivoted to the lower portions of said support and arm by respective pivots, the upper portions of said support and arm being interconnected to said frame by pivot means, said pivot means including at least one pivot that defines an axis parallel to the axes of said pivots, said control arm having an intermediate curved portion between its upper and lower portions and said curved portion being directed rearwardly with respect to the direction of travel of the implement, whereby said support can deflect rearwardly and said element maintains its working position, said support having an upper portion that is bent forwardly to loop over a beam of said frame and said upper support portion being fastened to said beam.

7. A soil working machine as claimed in claim 6, in which the pivotal axes of the pivots are at the corners of a pivotable polygon and comprise four pivotal axes, the lower two axes being located adjacent said element and the upper two axes being located adjacent said frame.

8. A soil working machine as claimed in claim 7, wherein said support has a curved intermediate portion that extends generally parallel and is located adjacent said arm.

* * * * *